United States Patent [19]

Smith

[11] 4,021,348

[45] May 3, 1977

[54] AERATED SEWERWAGE EFFLUENT DISPOSAL SYSTEM

[76] Inventor: Alvin Jack Smith, 4379 Modoc Road, Santa Barbara, Calif. 93105

[22] Filed: Oct. 15, 1975

[21] Appl. No.: 622,685

[52] U.S. Cl. .............................. 210/208; 210/241; 261/121 R
[51] Int. Cl.² .......................................... C02C 1/10
[58] Field of Search .............................. 210/13–15, 210/208, 242 A, 170, 207, 219, 241; 261/87, 91, 120, 121 R

[56] References Cited

UNITED STATES PATENTS

| | | | |
|---|---|---|---|
| 3,210,053 | 10/1965 | Boester | 210/208 |
| 3,595,783 | 7/1971 | Pflanz et al. | 210/14 |
| 3,733,263 | 5/1973 | Mandt | 210/14 |
| 3,745,113 | 7/1973 | Fuchs | 210/13 |

Primary Examiner—Thomas G. Wyse
Attorney, Agent, or Firm—William W. Haefliger

[57] ABSTRACT

A method of treating liquid sewage, including solids, includes
   a. collecting the solids in a horizontally elongated narrow zone at the bottom of a sewage pond,
   b. generating a stream of gas bubbles, and
   c. successively subjecting said solids lengthwise of said zone to impingement of said stream.

8 Claims, 4 Drawing Figures

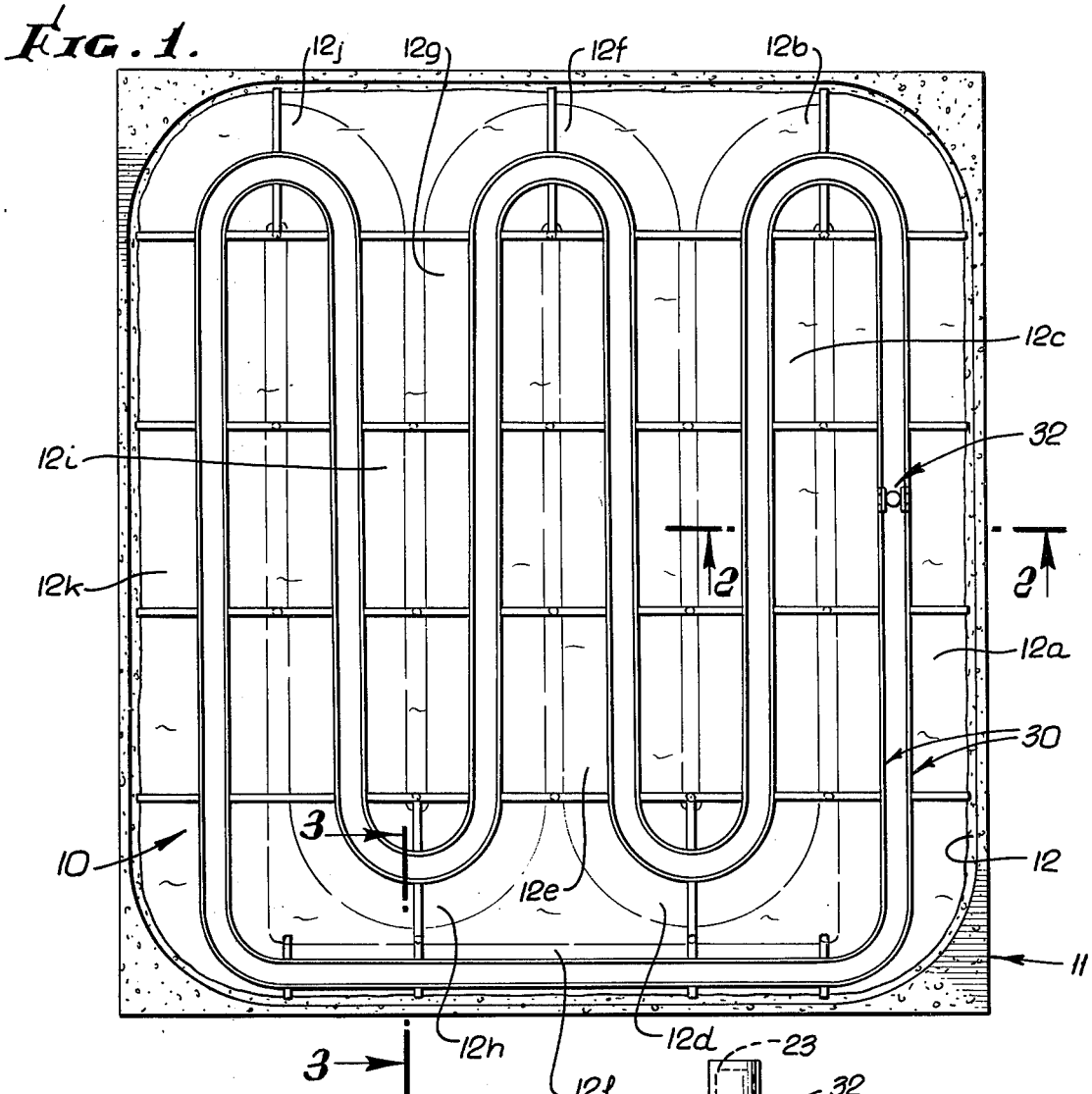
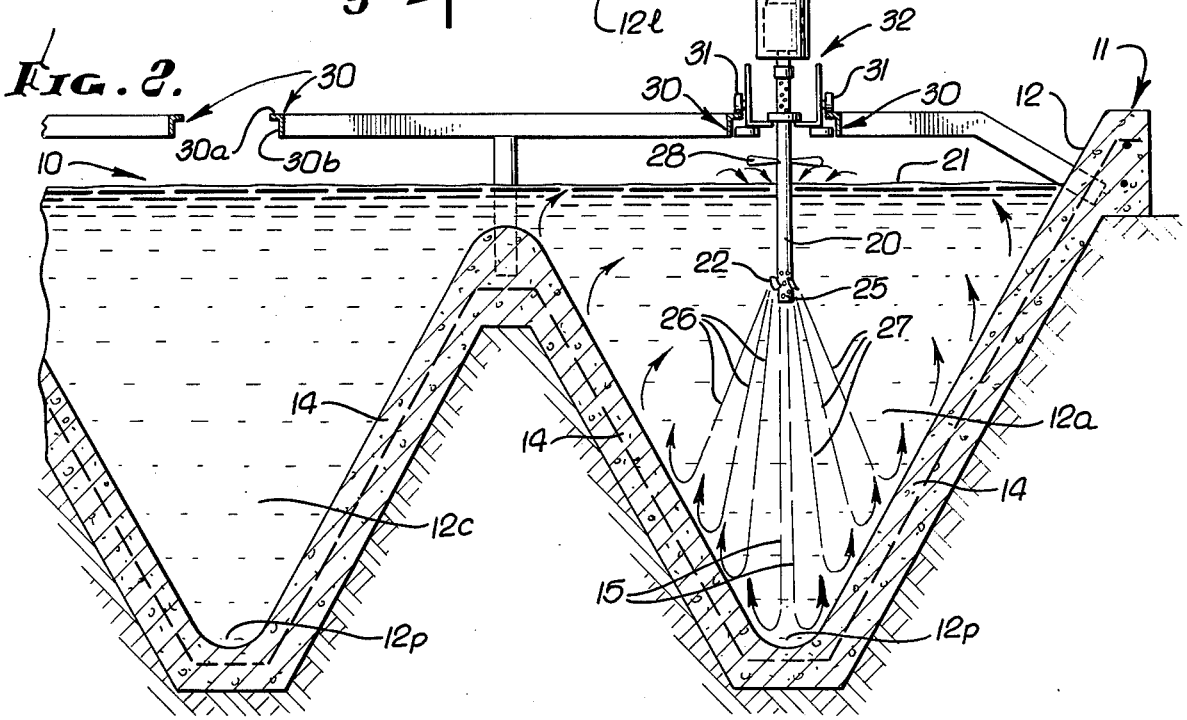

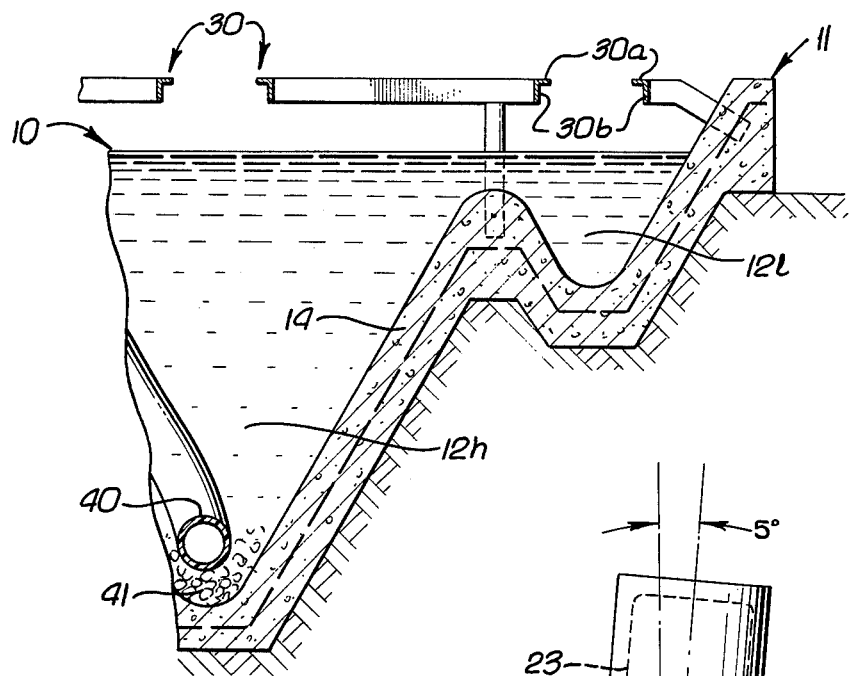
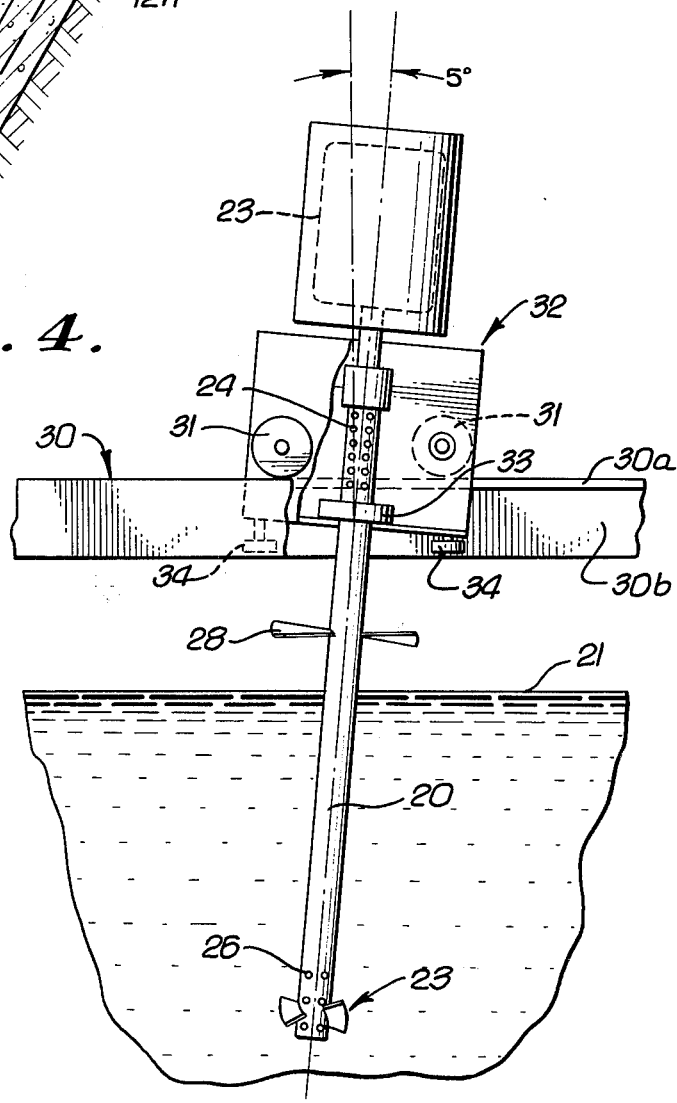

AERATED SEWERWAGE EFFLUENT DISPOSAL SYSTEM

BACKGROUND OF THE INVENTION

This invention relates generally to treatment of sewerage, and more particularly concerns apparatus and method to aerate and diffuse solid material in low cost as well as other sewerage disposal systems.

At the present time, many problems occur and recur in the physical treatment of sewage solids. Among these are incomplete break-up of sludge or solids due to irregular distribution of same, or so-called "pocketing"; clogging of sludge pumps; and the difficulty of removal of sludge from tanks or basins. Also, there is no fully satisfactory method to continuously treat sludge in a tank where it collects, the objective being break-up and diffusing of the sludge or solids into small flowable particles.

SUMMARY OF THE INVENTION

It is a major objective of the invention to provide solutions to the above and other associated problems and difficulties. Basically, a sewage treatment system incorporating the invention includes:

a. a receptacle for a liquid sewage pool, the receptacle forming a submerged trench having downwardly tapering side walls so that solids tend to collect in a narrow channel at the bottom of the trench,
  b. air injection means to inject air into the pool to form bubbles traveling downwardly therein to said narrow channel and into contact with said solids, and
  c. guide means extending above and along the trench to guide said air injection means to travel lengthwise of the trench.

As will appear, the trench may typically extend in an endless path forming a labyrinth, the trench having a generally V-shaped cross section throughout its major length; the air injection means may comprise an elongated and generally upright tube extending above and below the pool surface, a sub-surface impeller associated with the tube, and a motor to rotate the impeller causing gas such as air to be drawn downwardly within the tube and formed into bubbles in response to impeller rotation. Further, the air injection means may be suspended by the guide means to travel lengthwise thereof to continuously and progressively treat the solids collecting at the narrowed bottom of the trench and along its length. In addition, the impeller may be carried at an angle so as to develop thrust tending to urge or advance the air injection means along the guide means and about the basin as it repeatedly treats the solids with concentrated action to break-up and diffuse same in the pond.

These and other objects and advantages of the invention, as well as the details of an illustrative embodiment, will be more fully understood from the following description and drawings, in which:

DRAWING DESCRIPTION

FIG. 1 is a plan view of an installation incorporating the invention;

FIG. 2 is an enlarged vertical section on lines 2—2 of FIG. 1;

FIG. 3 is an enlarged vertical section on lines 3—3 of FIG. 1; and

FIG. 4 is an enlarged elevation showing motorized air injection means.

DETAILED DESCRIPTION

In the drawings, a liquid sewerage pond 10 is contained by a basin or receptacle 11 which forms a submerged trench having downwardly tapering side wall. The trench typically extends in an endless lengthwise extending path, and in the example the trench 12 including longitudinal stretches connected in sequence by curved portions 12a–12k, together with lateral "return" stretch 12l interconnecting stretches 12a and 12k at one end of the pond. Lateral stretch 12l is substantially more shallow than stretches and portions 12a–12k, as is clear from FIG. 3.

The side walls 14 of the trench taper downwardly, and the trench preferably has such V-shaped cross section that the walls extend at about 60° from horizontal. As a result, the sewerage solids tend to gravitate downwardly along the walls toward the narrow bottom portion or channel of the trench indicated at 12p, directly below guide means to be described. The trench should be less than about 10 feet deep, for best results.

Further in accordance with the invention, air injection means is provided to inject air into the liquid sewerage to form bubbles traveling downwardly to the narrow channel and into contact with the collected solids. Note in this regard the air bubble downward flow paths indicated at 15 in FIG. 2. As a result, the solids are subjected to vigorous concentrated aeration treatment tending to reduce their bulk and break them up, during the time that the air injection means travels over the solids, and this action recurs again and again as the air injection means travels cyclically over the length of the trench, as will appear.

In the example, the air injection means comprises an elongated generally upright tube 20 extending above and below the pool surface 21, a sub-surface axial flow impeller 22 associated with the tube, and a motor as at 23 operatively connected with the impeller to rotate it. This causes air to be drawn downwardly within the tube, as via air entrance ports 24, discharged at 25 and formed into a stream of bubbles in response to impeller rotation. The impeller may be carried by the tube near its lower end to induce downward substantially axial flow of water and bubbles as the tube is rotated by the motor, to produce water and bubble flow streams 15; in addition, downward and lateral water and bubble flow stream 27 and 26 are directed toward side walls 14 of the trench to scour them, loosening or aiding downward gravitation of solids toward narrow zone 12p at the bottom of the trench.

Also, the impeller operation reduces B.O.D. and suspended solids, together. It is found that if the B.O.D. reading is 16 ppm, generally suspended solids are also 16 ppm, due to treatment by high velocity bubbles and mechanical activation of the liquid. Note that the lower most portion of the tube may contain air outlet ports 25 at the impeller location to deliver air drawn downwardly in the tube into the water churned by the impeller, for bubble formation. The impeller tube shaft should typically project about 22 inches into the liquid, for best results; i.e. if the impeller and air exit ports 25 extend downwardly below the surface more than this amount, delivered air volume tends to be intermittent and may stop for considerable time intervals. A three quarter horsepower motor operating at about 3450

RPM will produce the required volume of air injected at about 1 psi.

Upper impeller 28 is carried by the tube 20 above water surface level, and operates to drive suds or froth downwardly, i.e. to keep it from rising up the tube exterior.

A further feature of the invention concerns the provision of guide means extending above and lengthwise of the trench to guide the air injection means along the trench so that the solids at the bottom of the trench may be successively and repeatedly treated; further, the air injection means may advantageously be suspended by the guide means to facilitate such travel. In the example, the guide means comprises spaced parallel rails 30 having horizontal and vertical portions 30a and 30b. Horizontal rail portions 30a support upper wheels 31 rotatably attached to a carriage 32, the latter supporting tube 20 as via a bearing 33; and vertical rail portion 30b guide the lateral wheels 34 rotatably attached to the carriage. As a result, the carriage is constrained to travel freely along and between the rails 30, directly above the trench zone 12p, and in an endless path.

Further, as shown in FIG. 4, the carriage may advantageously support the tube to extend at an angle (5° or more) from vertical, in a vertical plane extending lengthwise of the trench, so that the rotating impeller develops thrust urging the carriage, tube and motor along the rails, repeatedly traversing the trench lengthwise thereof. Therefore, the unit is made self-propelling, while it simultaneously treats all the submerged sludge and solids, efficiently and thoroughly. The motor may be powered electrically, pneumatically, hydraulically or by combustion. Further, no pumps are required for sludge displacement, and the remaining solids can be easily retrieved from the trench lowermost portion, at will, as via a suction line lowered into the trench. Such a line 40 seeks the bottom of the trench where the solids 41 are, due to the trench configuration.

Note in FIG. 3 that trench portion 12l is quite shallow, as it is designed primarily to facilitate return of the traveling carriage, tube and motor between trench sections 12k and 12a.

The basis operation of the system involves the following steps:
a. collecting the solids in a horizontally elongated narrow zone at the bottom of a sewage pond,
b. generating a stream of gas bubbles, and
c. successively subjecting said solids lengthwise of said zone to impingement of said stream.

Additional steps include directing the stream downwardly toward the solids while traveling the stream lengthwise of the zone, as long a labyrinthian endless path thereby to repeatedly treat the solids.

I claim:
1. In a sewage treatment system,
  a. a receptacle for a liquid sewage pool, the receptacle forming a submerged trench having downwardly tapering side walls so that solids tend to collect in a narrow channel at the bottom of the trench,
  b. gas injection means to inject gas into the pool to form bubbles traveling downwardly therein to said narrow channel and into contact with said solids, and
  c. guide rail means extending directly above and along the trench to guide said gas injection means to travel lengthwise of the trench, said gas injection means being carried by a carriage which is guided and suspended solely by said rail means to travel therealong and in an endless path.

2. The system of claim 1 wherein said trench extends in an endless path lengthwise thereof.

3. The system of claim 2 wherein said path forms a labyrinth.

4. The system of claim 1 wherein said trench has a generally V-shaped cross section.

5. The system of claim 1 wherein the trench walls extend at an angle of about 60° from horizontal.

6. The system of claim 1 wherein said gas comprises air and said air injection means comprises an elongated generally upright tube extending above and below the surface of said pool, a sub-surface impeller assoicated with the tube, and a motor operatively connected with the impeller to rotate same causing air to be drawn downwardly within the tube and formed into said bubbles in response to impeller rotation.

7. The system of claim 6 wherein said impeller is carried by the tube which extends at an angle from vertical so that the rotating impeller develops thrust tending to urge said air injection means along said guide means.

8. The system of claim 6 wherein said impeller is carried by the tube, and including a second impeller carried by the tube above said liquid sewerage surface level so as to rotate and block upward travel of sewerage froth on the tube, there being air outlet porting from the tube near the first impeller, said outlet porting and the first impeller projecting below the pond surface about 22 inches.

* * * * *